W. H. STEPHENSON.
Stove-Pipes.
No. 135,170.  Patented Jan. 21, 1873.
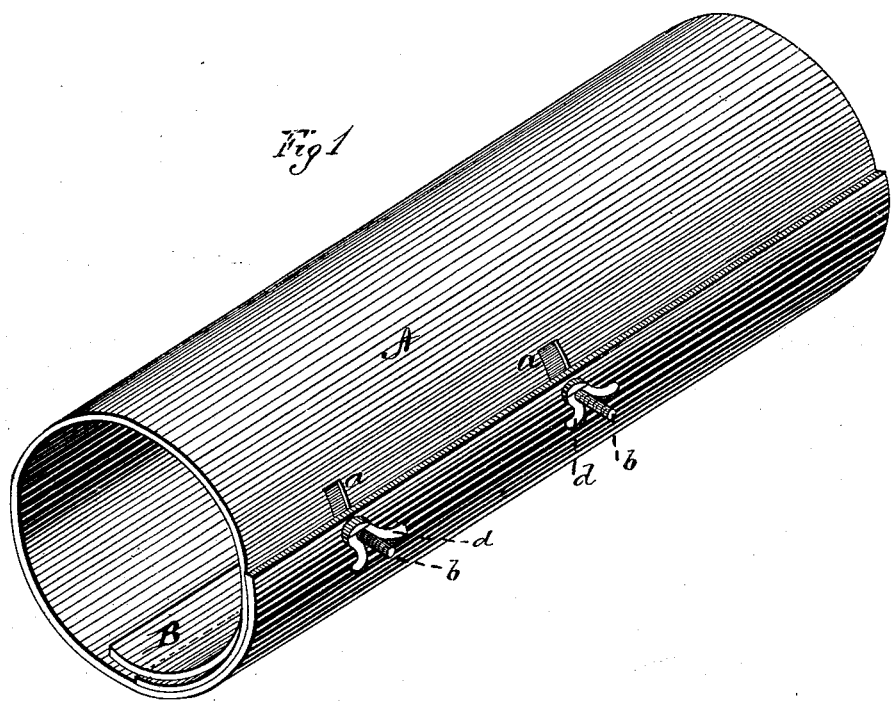
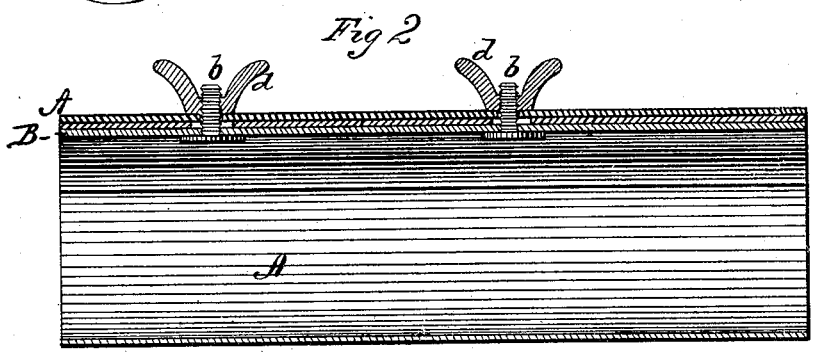
Witness:
Franck L. Durand
C. L. Everit
Inventor.
Wm H. Stephenson
per
Alexander Mason
Attorneys.

UNITED STATES PATENT OFFICE.

WILLIAM H. STEPHENSON, OF BLUFFTON, INDIANA.

IMPROVEMENT IN STOVE-PIPES.

Specification forming part of Letters Patent No. 135,170, dated January 21, 1873.

*To all whom it may concern:*

Be it known that I, WM. H. STEPHENSON, of Bluffton, in the county of Wells and in the State of Indiana, have invented certain new and useful Improvements in Adjustable Stove-Pipe; and do hereby declare that the following is a full, clear, and exact description thereof, reference being had to the accompanying drawing and to the letters of reference marked thereon making a part of this specification.

The nature of my invention consists in the construction and arrangement of an adjustable stove-pipe whereby the pipe may be made larger or smaller, as desired, to facilitate the fitting of the pipe in the flue, and to form the tapering or lower point.

In order to enable others skilled in the art to which my invention appertains to make and use the same, I will now proceed to describe its construction and operation, referring to the annexed drawing, in which—

Figure 1 is a perspective view, and Fig. 2 a longitudinal section of my adjustable stove-pipe.

Along one edge of a piece of sheet metal, A, to form a length of stove-pipe, I make a series of slots, $a\,a$, running from the edge inward for a suitable distance. Near the opposite edge are made holes corresponding with the slots $a$, so that when the sheet metal is bent to form the pipe bolts $b\,b$ may be passed from the inside through the slots and holes and be fastened by thumb-nuts $d\,d$ on the outer ends of the bolts. On the inside of the pipe thus formed is placed a sheet-metal strip, B, of suitable width and length, through which the bolts $b\,b$ also pass, said strip forming a lining to prevent the smoke from passing out of the slots $a\,a$. This lining can be placed on the outside of the pipe as well as on the inside and answer the same purpose.

Having thus fully described my invention, what I claim as new, and desire to secure by Letters Patent, is—

The overlapping and slotted stove-pipe, in combination with the internal plate B and its bolts, for the purpose of securing the pipe in position after adjustment and covering the slots in the pipe, as is herein set forth.

In testimony that I claim the foregoing I have hereunto set my hand this 22d day of November, 1872.

WM. H. STEPHENSON.

Witnesses:
  JOHN K. RINEHART,
  JACOB J. TODD.